United States Patent [19]

Nagano

[11] Patent Number: 5,152,045
[45] Date of Patent: Oct. 6, 1992

[54] ADJUSTING JIG FOR CANTILEVER TYPE BRAKE APPARATUS FOR USE IN A BICYCLE

[75] Inventor: Masashi Nagano, Izumi, Japan

[73] Assignee: Shimano, Inc., Osaka, Japan

[21] Appl. No.: 681,712

[22] Filed: Apr. 8, 1991

[30] Foreign Application Priority Data

Apr. 16, 1990 [JP] Japan .................. 2-40894[U]

[51] Int. Cl.$^5$ ............................... B25B 27/14
[52] U.S. Cl. .................................. 29/281.5
[58] Field of Search ............ 33/501.45, 609, 501, 33/613, 826; 29/281.5, 271

[56] References Cited

U.S. PATENT DOCUMENTS

| 536,676 | 4/1895 | Wilcox | 33/826 |
| 1,857,951 | 5/1932 | Gadd | 33/501 |
| 3,201,874 | 8/1965 | Christy | 33/613 |
| 3,540,106 | 11/1970 | Goldman | |
| 3,969,964 | 7/1976 | George et al. | |
| 4,958,814 | 9/1990 | Johnson | 33/613 |

FOREIGN PATENT DOCUMENTS 889645 9/1942 France .

OTHER PUBLICATIONS

Le Cycle, vol. 18, No. 42 "Nouveautes documents" p. 13.

Primary Examiner—Robert C. Watson
Attorney, Agent, or Firm—Dickstein, Shapiro & Morin

[57] ABSTRACT

An adjusting jig for a cantilever type brake apparatus for use in a bicycle, comprising a main body, and a pair of distance limiting portions for contacting right and left lever arms.

The distance limiting portions is mounted on the main body such that a distance between the lever arms is set to a predetermined value with the distance limiting portions contacting the lever arms.

4 Claims, 6 Drawing Sheets

ADJUSTING JIG FOR CANTILEVER TYPE BRAKE APPARATUS FOR USE IN A BICYCLE

BACKGROUND OF INVENTION

1. Field of the Invention

The present invention relates to an adjusting jig for adjusting a fixing position of a brake shoe in a cantilever type brake apparatus for use in a bicycle.

2. Description of the Related Art

Conventionally, there exists no adjusting jig for the cantilever type brake apparatus as noted above.

The fixing position of the brake shoe relative to the cantilever type brake apparatus is adjusted in response to a desired width of the rim while the cyclist watches a contact position of the brake shoe relative to a rim, thereby to fix the brake shoe.

However, in the conventional method, the degree of freedom of the fixing position of the brake shoe relative to the brake apparatus is great. When the brake apparatus is actuated to contact the brake shoe with the rim, an angle of an lever arm for oscillating the brake shoe in the brake apparatus tends to be inconstant, and it is difficult to conform a pulling direction of a wire connected to the lever arm with a proper direction. It is particularly difficult for beginners to accurately adjust the brake shoe, as a result of which a proper moment cannot be applied to the lever arm of the brake apparatus. This possibly leads to an insufficient performance of the entire brake apparatus.

A primary object of the present invention is to provide an adjusting jig for a cantilever type brake apparatus for use in a bicycle in which a fixing position of a brake shoe is accurately adjustable such that the performance of the brake apparatus is fully exerted.

SUMMARY OF THE INVENTION

In order to achieve the above-noted object, an adjusting jig for a cantilever type brake apparatus for use in a bicycle according to the present invention is characterized by a main body, and a pair of distance limiting portions for contacting right and left lever arms, in which the distance limiting portions are mounted on the main body such that a distance between the lever arms is set to a predetermined value with the distance limiting portions contacting the lever arms.

With such a characteristic structure, when the distance limiting contact portions are engaged with the lever arms, respectively, the distance between the lever arms is determined as a fixed value. Each of the brake shoes is fixed to each of the lever arms while contacting the rim with the adjusting jig being engaged with the lever arms, which does not require the cyclist to pay attention to adjustment of the distance between the lever arms and allows him or her to concentrate on adjusting the positions of the brake shoes. Thus, even the beginners can readily effect such an adjustment. Since the distance between the lever arms is determined as the fixed value, an angle of each lever arm when the brake apparatus contacts the rim is set to a substantially error-free predetermined value by attachment of the adjusting jig regardless of the width of the rim. As a result, a value of a moment applied to each lever arm can be substantially constant.

Thus, the present invention can provide an adjusting jig for a cantilever type brake apparatus for use in a bicycle in which a fixing position of a brake shoe is accurately adjustable such that the performance of the braking apparatus is fully exerted.

Other objects, structures and advantages will be apparent from the following description.

BRIEF DESCRIPTION OF THE DRAWINGS

FIGS. 1 through 5 show a first embodiment of an adjusting jig for a cantilever type brake apparatus for use in a bicycle relating to the present invention in which:

FIG. 1 is a front view of the cantilever type brake apparatus before brake shoes are fixed;

FIG. 2 is a front view of the cantilever type brake apparatus after the brake shoes are fixed;

FIG. 3 is a front view of the cantilever type brake apparatus;

FIG. 4 is a perspective view of an adjusting jig; and

FIG. 5 is an exploded perspective view of the cantilever type brake apparatus;

FIGS. 6 and 7 show a second embodiment of the present invention in which:

FIG. 6 is a front view of the cantilever type brake apparatus before the brake shoe is fixed; and FIG. 7 is a perspective view of an adjusting jig.

DESCRIPTION OF THE PREFERRED EMBODIMENTS

An adjusting jig for a cantilever type brake apparatus according to a first embodiment of the present invention will be described hereinafter referring to FIGS. 1 through 5.

Figure 3:
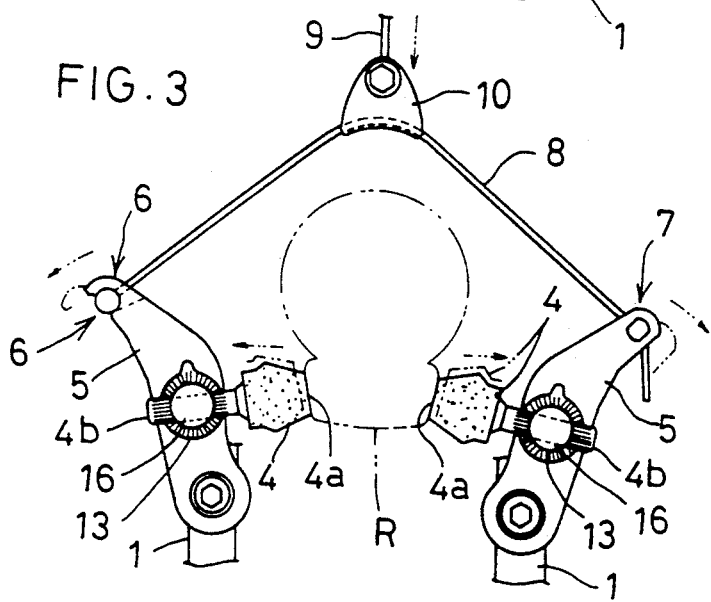
Figure 5:
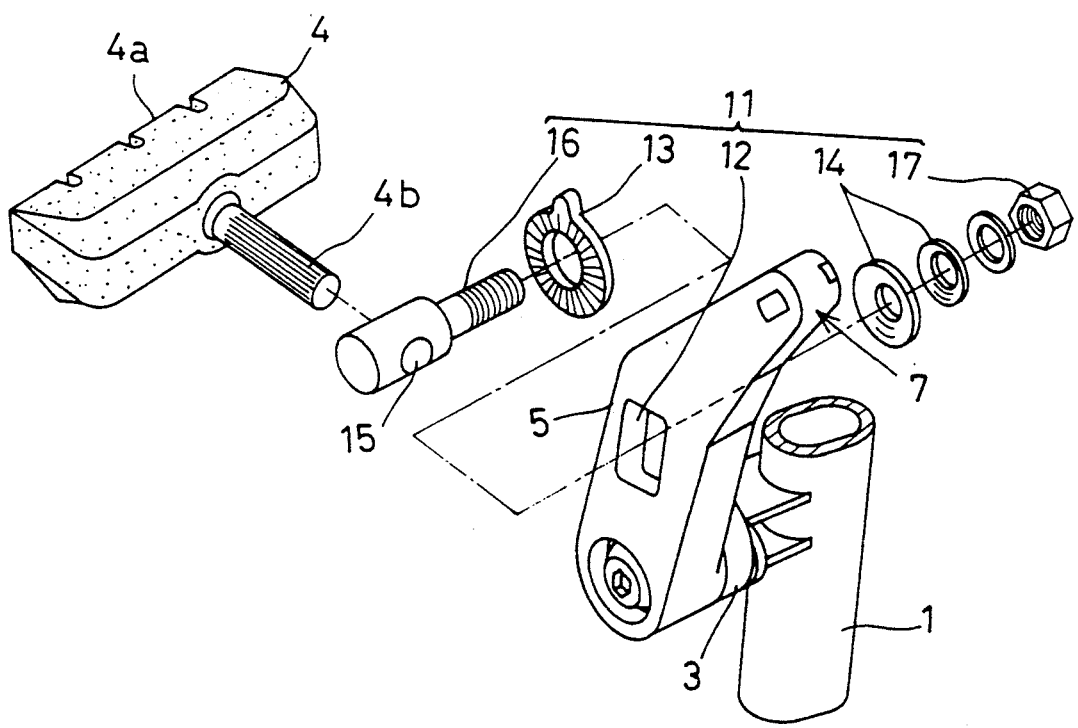

FIGS. 3 and 5 show cantilever type braking members provided in two front forks 1 of a mountain bike as it is called. Each front fork 1 includes a fixing member 3 fixed thereto. A lever arm 5 provided with a brake shoe 4 is pivotably supported at a lower portion of the fixing member 3, and urged in a direction for keeping the brake shoe 4 away from a rim R. The both lever arms 5 define wire connecting portions 6 and 7 in upper portions thereof, respectively. A center wire 8 extends between the wire connecting portions 6 and 7 and has a hanger 10 fixed to an intermediate portion thereof and connected to a control wire 9 extending from a control lever (not shown). When the center wire 8 is pulled at the intermediate portion, the opposite brake shoes 4 move close to the rim against an urging force of the lever arms thereby to brake the bicycle.

Figure 1:
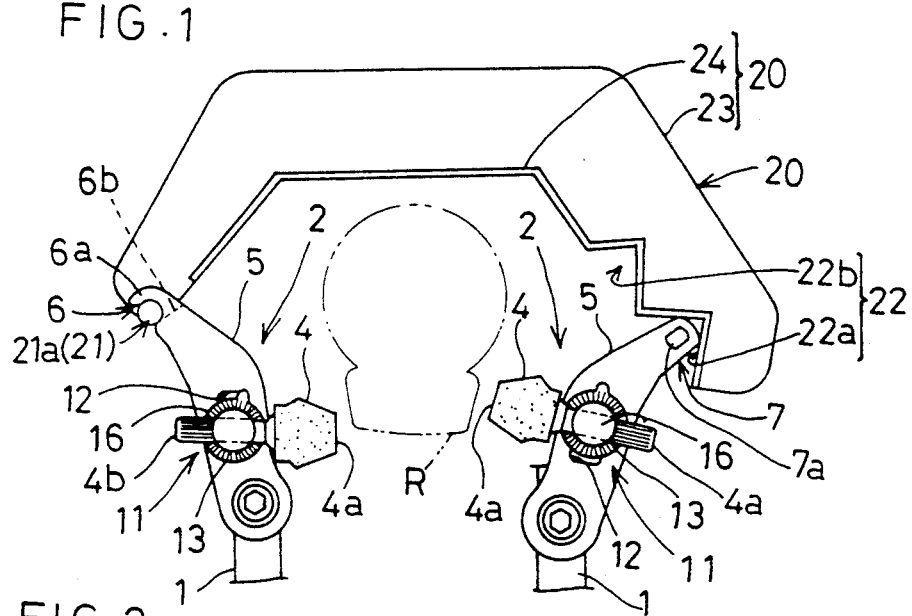

In FIG. 1, the left wire connecting portion 6 includes a hook 6a for engaging a nipple defined in one end of the center wire 8, and defines a wire receiving groove 6b communicating with the hook 6a, through which the wire extending from the nipple is inserted. The right wire connecting portion 7 includes an anchor 7a for fixing the other end of the center wire 8 to a desired drawing amount.

As shown in FIG. 5, each of the brake shoes 4 is made of rigid rubber material and includes a flat braking face 4a defined along a longitudinal direction thereof, and a mounting pin 4b extending from an opposite face to the braking face for fixing the brake shoe to the lever arm 5. A brake shoe adjusting mechanism 11 is provided in each lever arm 5 for adjusting a fixing position of the brake shoe. The brake shoe adjusting mechanism 11 defines a slot 12 elongated in a vertical direction in an intermediate portion of the lever arm 5. An adjusting washer 13 having opposite inclined faces is mounted on one side of the slot 12 for adjusting a toe-in angle while spherical spacers 14 are mounted on the other side of the slot 12. A bolt 16 defining a mounting bore for receiving the mounting pin 4b is inserted from the adjusting washer 13 through the spherical spacers, at which a fastening nut 17 is screwed to an extreme end of the bolt 16. The fixing position of the brake shoe 4 can be adjusted in the vertical direction along the slot 12, a direction of rotation of the bolt 16, an advancing or retracting direction of the mounting pin 4b relative to the mounting bore 15, and a spherical direction defined by the spherical spacers 14, and be fixed to the arm 5 by fastening the nut 17.

Figure 4:
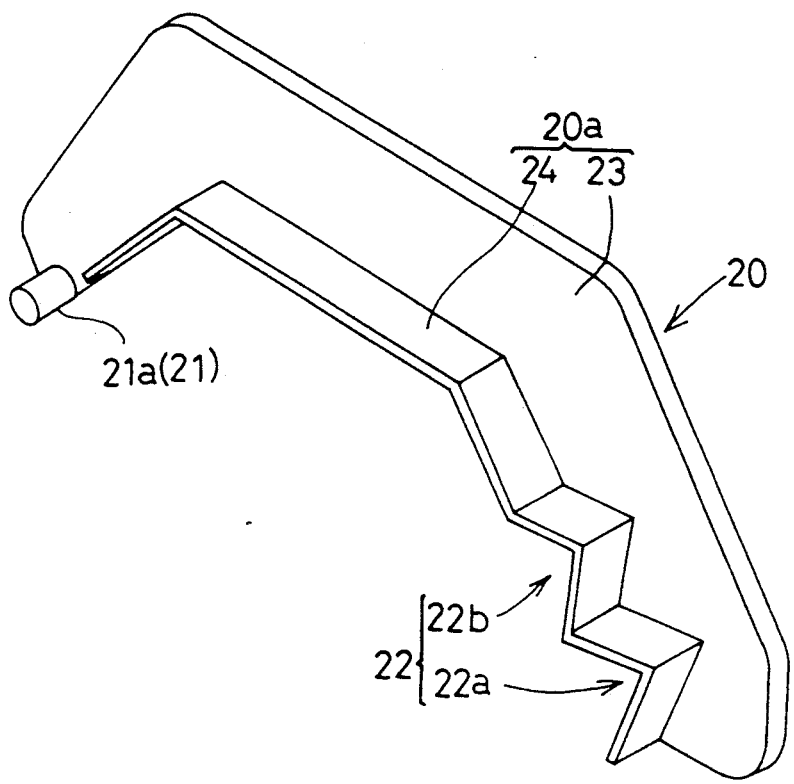

As seen from FIG. 4, an adjusting jig 20 according to the present invention is made of rigid synthetic resin and has an arcuate configuration in side view. A pair of mounting portions 21 and 22 to the wire connecting portions 6 and 7 are provided in opposite end portion of a main body 20a. The main body 20a includes an arcuate vertical plate 23 and a horizontal plate 24 mounted along a lower end of the vertical plate 23, which plates are integrally formed to be perpendicular to each other.

The left mounting portion 21 shown in FIGS. 1 and 4 includes an engaging cylindrical portion 21a having substantially the same configuration as the nipple for engaging with the hook 6a. On the other hand, the right mounting portion 22 includes two step-like portions 22a and 22b defining different distances from the engaging cylindrical portion 21a such that a single adjusting jig 20 could adjust two types of brake members 2 defining different distances between the wire connecting portions 6 and 7. More particularly, the engaging cylindrical portion 21a and the step-like portions 22a and 22b form a distance limiting contact portion for limiting a distance between the wire connecting portions 6 and 7. Each of the step-like portions 22a and 22b includes a horizontal face contacting an upper end of the wire connecting portion 7 and a vertical face contacting a portion of the wire connection portion 7 away from the rim R (referred to as an outer face hereinafter). A lower end of the vertical face is slightly inclined to be positioned close to the engaging cylindrical portion 21a.

A process of adjusting the brake shoes 4 utilizing the adjusting jig 20 will be described next.

As shown in FIG. 1, in order to attach the adjusting jig 20 to the brake members 2, the engaging cylindrical portion 21a of the left mounting portion 21 is engaged with the hook 6a of the left wire connecting portion 6. In this condition, the vertical plate 23 is fitted into the the wire receiving groove 6b, which prevents the adjusting jig 20 from falling in a fore and aft direction. Next, one of the step-like portions 22a and 22b of the right wire mounting portion 22 is brought to contact with the right wire connecting portion 7. Since the outer face of the right wire connecting portion 7 is pressed to the vertical face of the step-like portion 22a under the urging force of the arm 5 thereby to be limited in its rest position, the distance between the right and left wire connecting portions 6 and 7 is maintained in a predetermined value. This value is determined such that transmission efficiency of a moment from the wires 8 and 9 to the arms 5 can be promoted.

Figure 2:
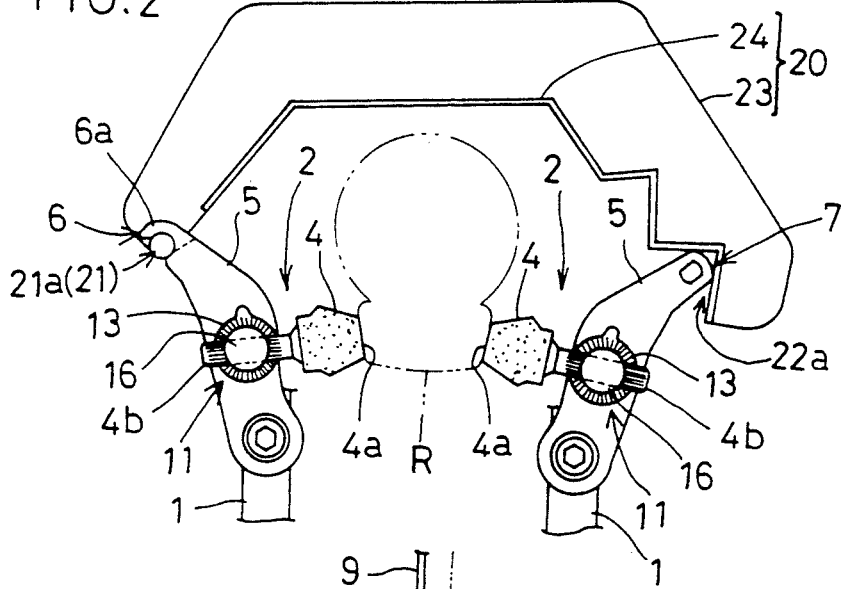

Then, after the nut 17 of the each brake shoe adjusting mechanism 11 is loosened, the fixing position of each brake shoe 4 is adjusted, as shown in FIG. 2. Since the fixing position of each brake shoe 4 is substantially determined by contact between the braking face 4a and the rim R, it is substantially sufficient to adjust advancing amounts of both of the mounting pins 4b from the mounting bores 15 defined in the mounting bolts 16 to be equal to each other in the right and left brake members, and then adjust toe-in angles by rotating the adjusting washers 13.

A second embodiment will be described below referring to FIGS. 6 and 7.

Each of the brake members 2 to be adjusted in this embodiment is identical to that of the first embodiment except for the structures of a hanger 10' and wires 8' and 9. The second embodiment employs the control wire 9 extending from the control lever and the short wire 8' having nipples at opposite ends thereof. The hanger 10' includes a wire fixing portion 10'a for receiving and fixing the control wire 9, and a nipple hook for receiving the nipple at the one end of the short wire 8'.

Figure 6:
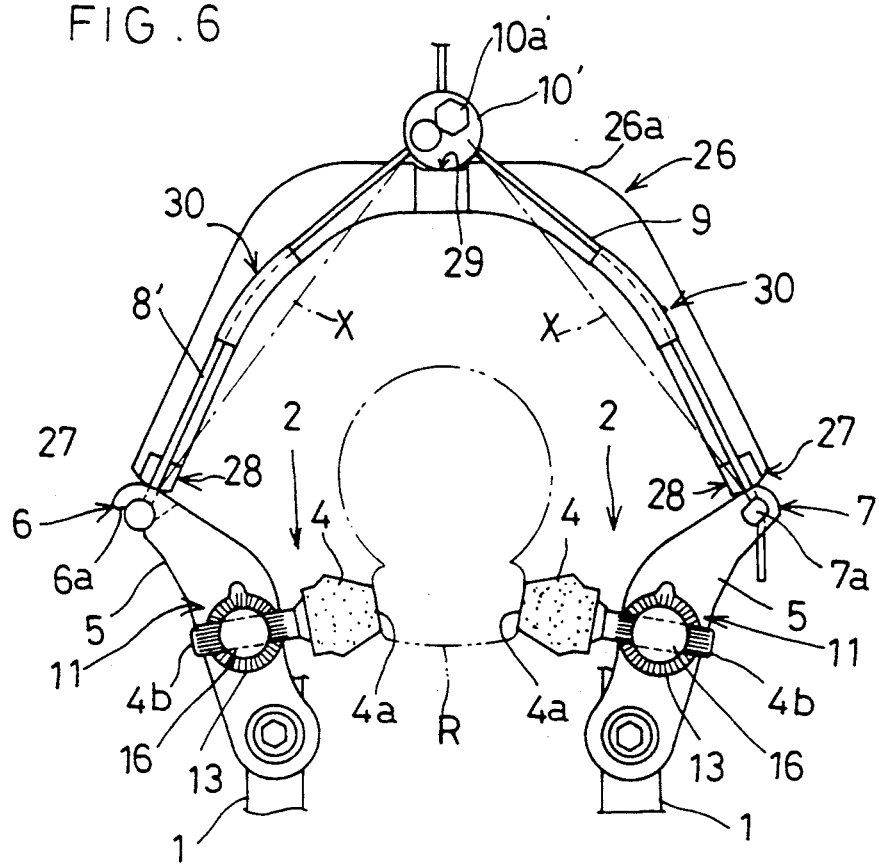
Figure 7:
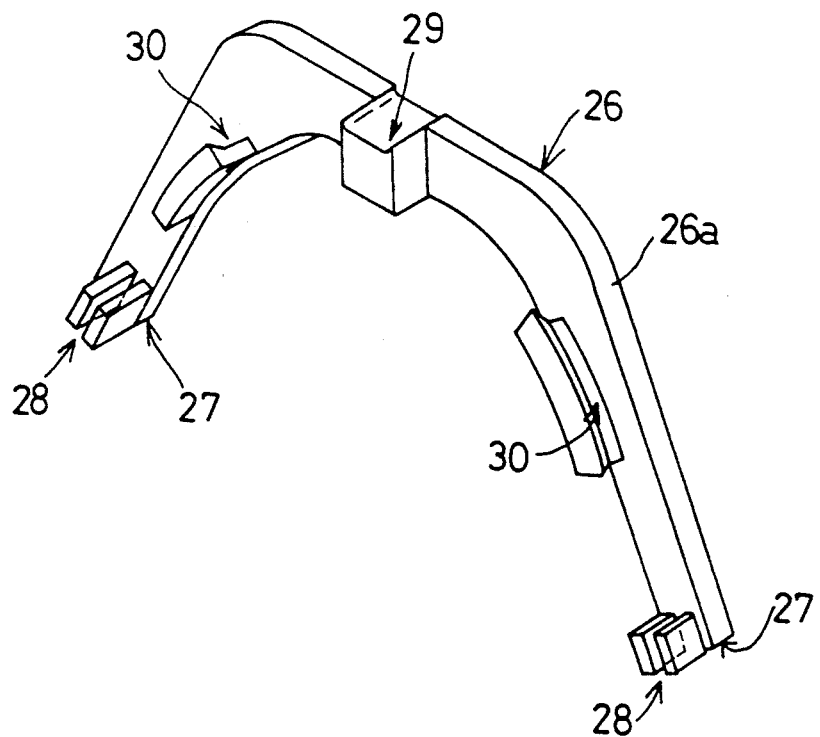

As shown in FIG. 7, an adjusting jig 26 is made of metallic material formed to an arcuate configuration in side view by press molding, and includes a main body 26a having flat opposite ends 27 to act as right and left contact portions relative to the wire connecting portions 6 and 7. In other words, these contact portions 27 form the distance limiting contact portion for limiting the distance between the wire connecting portions 6 and 7. Adjacent each of the contact portions 27 is mounted a forward projection having a wire receiving groove to form a wire hooking portion 28 such that the adjusting jig 26 is engaged with the wires 8' and 9 extending between the wire connecting portions 6 and 7. Another forward projection is defined between the contact portions 27 of the adjusting jig 26 and has a dented upper surface thereby to form a hanger engaging portion 29 for engaging the hanger 10'. The upper surface of the hanger engaging portion 29 is substantially flat to facilitate attachment and detachment of the hanger 10'. As seen from FIG. 6, wire engaging portions 30 are provided between the hanger engaging portion 29 and the wire connecting portions 6 and 7, respectively, for engaging the wires 8' and 9 such that these wires 8' and 9 attached to the wire connecting portions 6 and 7 are maintained in positions displaced from straight paths X extending between the hanger engaging portion 29 and the contact portions 27, respectively.

A process of adjusting the brake shoes 4 utilizing the adjusting jig 26 will be described hereinafter.

As shown in FIG. 6, in order to attach the adjusting jig 26 to the brake members 2, the short wire 8 engaged with the hook 6a of the left wire connecting portion 6 and the control wire 9 inserted into the anchor 7a of the right wire connecting portion 7 are inserted through the wire receiving grooves of the wire hooking portions 28, the hanger 10' is engaged with the hanger engaging portion 29, and the wires 8' and 9 are engaged with the wire engaging portions 30. After a free end of the control wire 9 extending from the anchor 7a is pulled, the anchor 7a and the wire fixing portion 10'a are fastened thereby to determine a drawing amount of the control wire 9. In such a condition, the wire hooking portions 28 are engaged with the wires 8' and 9, and the contact portions 27 are positioned relative to the wire connecting portions 6 and 7 and pressed thereto. Thus, the distance between the wire connecting portions 6 and 7 is determined as a predetermined value as in the first embodiment, and concurrently the drawing amount of the control wire 9 can be set to a proper value.

When the fixing positions of the brake shoes 4 are adjusted with the same process as that of the first embodiment, the brake members 2 are completely adjusted simply by removing the adjusting jig 26.

Other embodiments will be described below.

Figure 8:
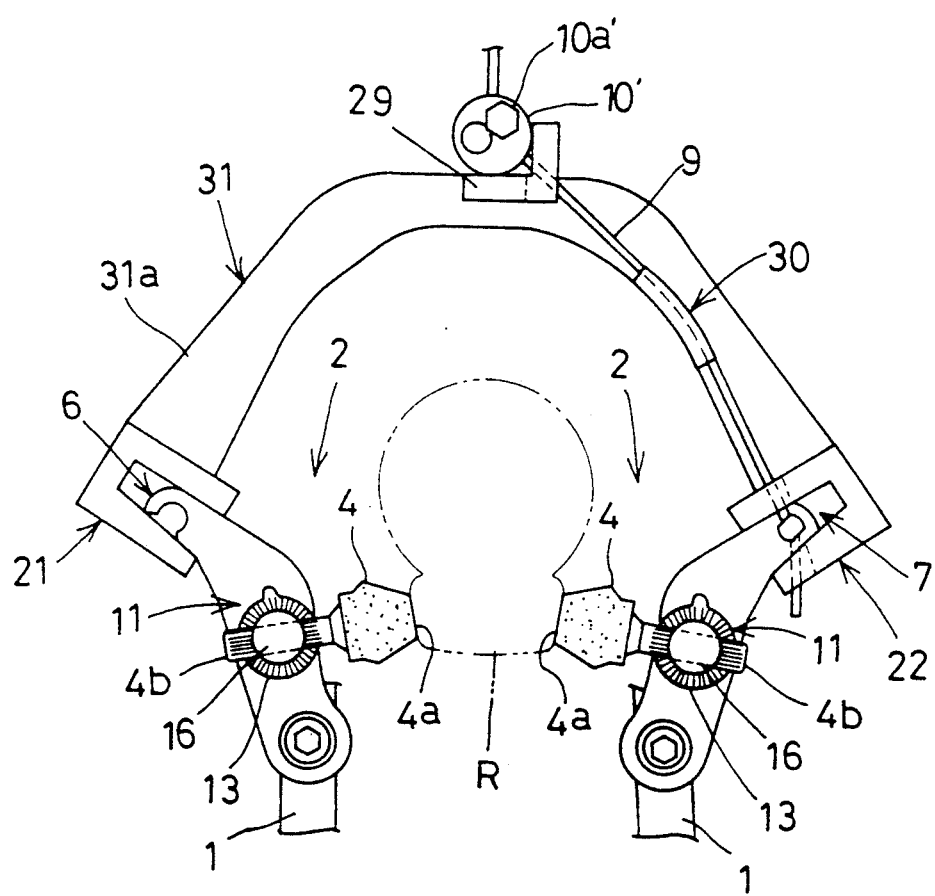
FIG. 8 is a front view of the cantilever type brake apparatus according to a further embodiment.

In the first embodiment, the mounting portions are formed of the engaging cylindrical portion 21a and the step-like portions 22a and 22b, but may be formed of converted U-shape portions at opposite ends of a main body 31a for engaging the wire connecting portions 6 and 7 from outer and inner sides. In this case, the hanger engaging portion 29 and the wire engaging portion 30 in the second embodiment may be provided in an adjusting jig 31. Each of the mounting portions may define a cross section having opposite ends opened in a longitudinal direction of the mounting bolt 16, or a cross section having an opened one end and the closed other end. When the object to be adjusted has the hanger 10' of the second embodiment, the hanger engaging portion 29 may be formed such that the hanger 10' does not move toward the right wire connecting portion having the anchor 7a, which does not require the left wire engaging portion 30 as shown in FIG. 8.

According to the foregoing embodiment, the distances between the wire connecting portions 6 and 7 and between the contact portions are constant, but may be adjustable by dividing the adjusting jig into two parts.

The step-like portions 22a and 22b are provided only in the right mounting portion in the first embodiment, but may be provided in the left mounting portion.

Figure 9A:
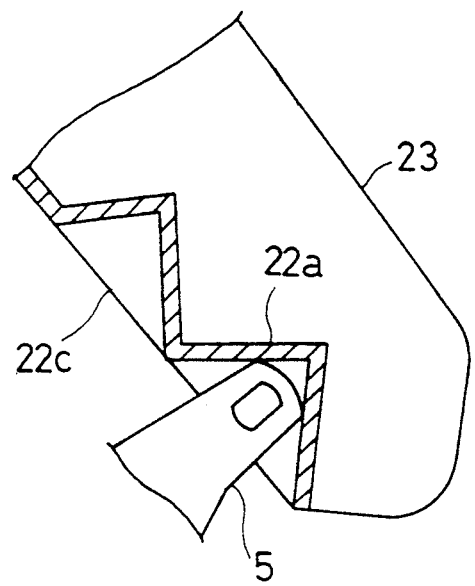
FIG. 9(a) is a sectional front view of a modified example of step-like portions of the first embodiment.
Figure 9B:
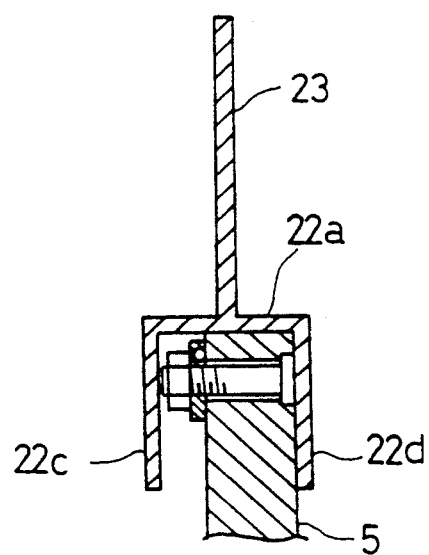
FIG. 9(b) is a sectional side view of the modified example of the step-like portions of the first embodiment.

As shown in FIGS. 9(a) and 9(b), the step-like portions 22a and 22b in the first embodiment may be provided with vertical faces 22c and 22d contacting the arm lever 5 from the front and the rear thereby to prevent the adjusting jig 20 from shaking.

Figure 10:
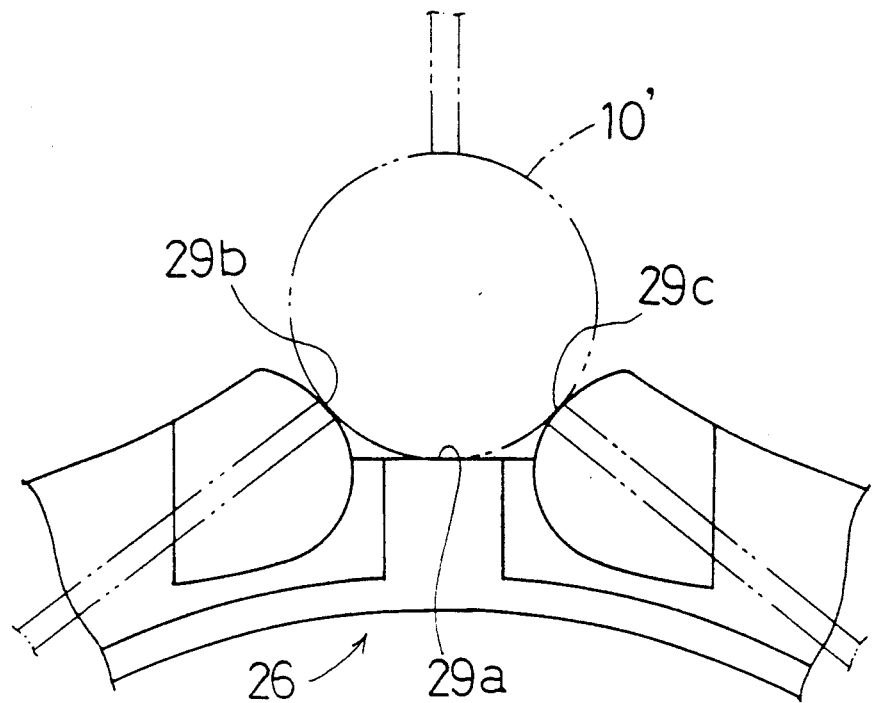
FIG. 10(a) is a front view of a hanger engaging portion of the second embodiment.
FIG. 10(b) is a plan view of the hanger engaging portion of the second embodiment.
Figure 10:
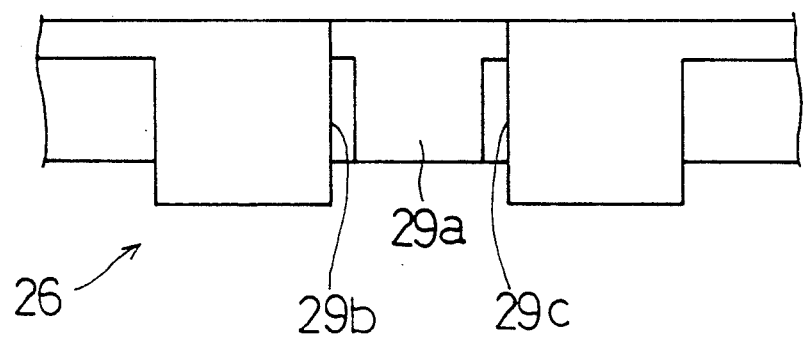

As can be seen from FIGS. 10(a) and 10(b), the hanger engaging portion may include a flat face 29a, a pair of contact portions 29b and 29c projecting forwardly of the flat face 29a. In this case, the contact portions 29b and 29c together support the hanger 10' obliquely upwardly from right and left lower sides, which prevents variance of an arch ratio and one-side actuation of the brakes. Also, it may be possible to support the hanger only by the pair of contact portions 29b and 29c, which can dispense with the flat face 29a.

What is claimed is:

1. An adjusting jig for adjusting a cantilever type brake having first and second rotatable lever arms, first and second wire connecting portions mounted on the first and second lever arms, respectively, brake shoes mounted on the lever arms, and control wire means connected to the wire connecting portions for rotating the lever arms, said adjusting jig comprising:

an arched main body having a base portion with two ends, and first and second arms extending from the ends of the base portion;

wherein each of the arms of the adjusting jig has an end region, and wherein first and second distance limiting portions for contacting the wire connecting portions are formed in the end regions of the first and second arms, respectively, and wherein the distance between the distance limiting portions is such that a distance between the lever arms is set to a predetermined value when the distance limiting portions are in contact with the wire connecting portions; and wherein the adjusting jig includes assisting means for holding the wire connecting portions in place in contact with the distance limiting portions and for preventing the wire connecting portions from being disengaged from the distance limiting portions.

2. An adjusting jig as claimed in claim 1 wherein the assisting means includes: (A) an engaging portion formed in the first distance limiting portion, said engaging portion being engageable with the first wire connecting portion; and (B) a step-like portion formed in the second distance limiting portion, said step-like portion having two faces for contacting the second wire connecting portion, and wherein the two faces are generally perpendicular to each other.

3. An adjusting jig as claimed in claim 1 wherein the assisting means includes: (A) guide portions for guiding the control wire means, said guide portions being formed on the arms of the adjusting jig; and (B) a support portion for supporting the control wire means, said support portion being formed in the base portion of the arched main body.

4. An adjusting jig for a cantilever type brake apparatus for use in a bicycle, comprising:

a main body, and a pair of distance limiting portions for contacting right and left lever arms, said distance limiting portions being mounted on the main body such that a distance between the lever arms is set to a predetermined value with the distance limiting portions contacting the lever arms;

wherein said distance limiting portions are attachable to wire connecting portions defined in the lever arms, respectively;

wherein one of said distance limiting portions is engageable with one of the wire connecting portions;

wherein the other of said distance limiting portions is formed of step-like portions contacting the other of the wire connecting portions; and wherein each of said step-like portions includes a horizontal face contacting an upper end of the wire connecting portion and a vertical face contacting an outer face of the wire connecting portion.

* * * * *